Dec. 30, 1952  L. F. MILLER  2,623,252
MOLDING MACHINE
Filed July 14, 1949  5 Sheets-Sheet 1

INVENTOR.
LEON F. MILLER
BY
Oberlin & Limbach
ATTORNEYS.

INVENTOR.
LEON F. MILLER
BY
Oberlin & Limbach
ATTORNEYS.

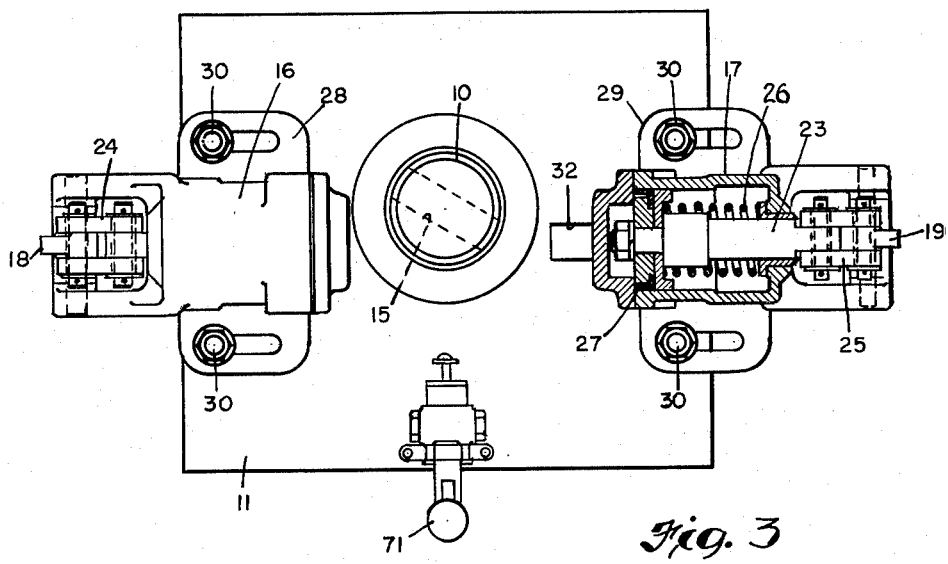
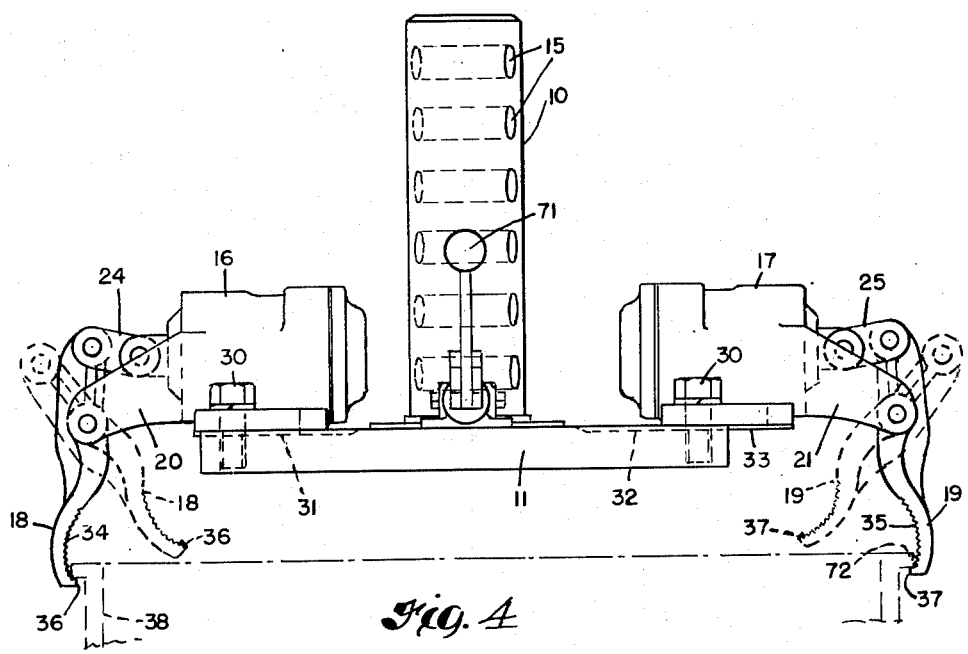

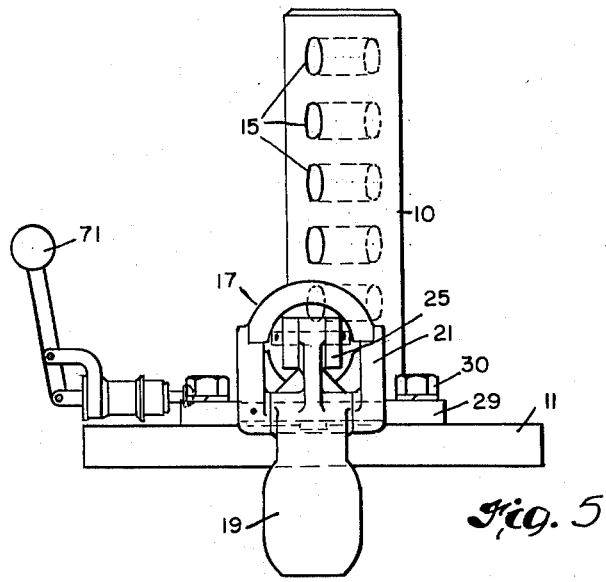
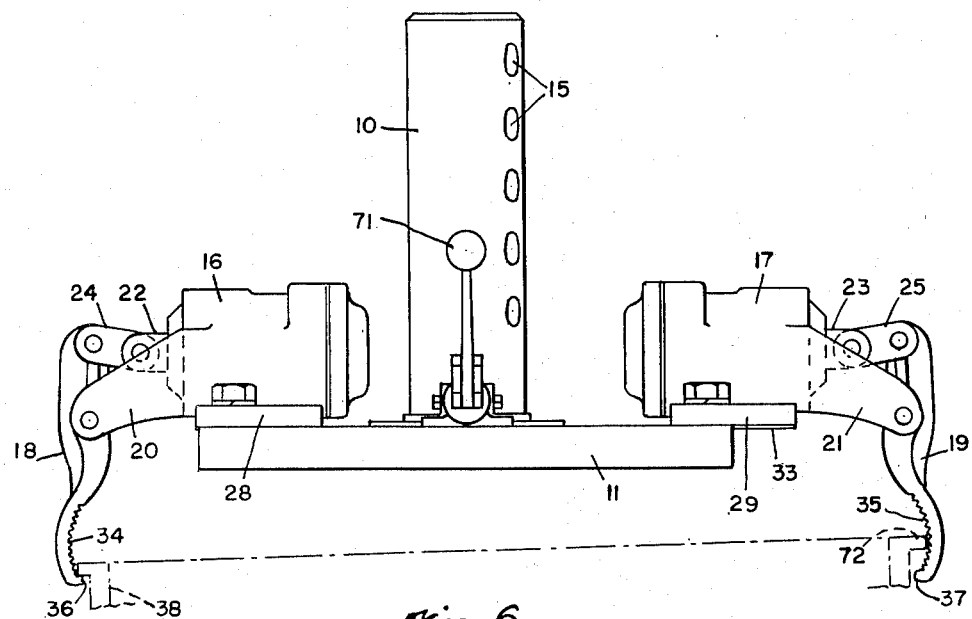

Dec. 30, 1952 L. F. MILLER 2,623,252
MOLDING MACHINE
Filed July 14, 1949 5 Sheets-Sheet 5

INVENTOR.
LEON F. MILLER
BY
Oberlin + Limbach
ATTORNEYS

Patented Dec. 30, 1952

2,623,252

UNITED STATES PATENT OFFICE 2,623,252

MOLDING MACHINE

Leon F. Miller, Fairview Park, Ohio, assignor to The Osborn Manufacturing Company, Cleveland, Ohio, a corporation of Ohio Application July 14, 1949, Serial No. 104,769

4 Claims. (Cl. 22—32)

This invention relates as indicated to molding machines and, more particularly, to molding machines of the jolt-squeeze type adapted for match-plate molding wherein cope and drag molds are formed from patterns fixed to opposite sides of a single pattern plate or board.

In Oyster et al. Patent No. 2,012,478 there is disclosed a mold-making machine of the jolt-squeeze type in which special means is provided to support the mold flask assembly to facilitate rolling the latter over whereby the drag mold which has been filled and rammed may be brought into the lower position with the cope flask above, ready to be filled. In such machine a pair of vertical standards disposed to either side of the jolt table and carrying trunnion cradles at their upper ends are adapted to rise to engage mating split trunnions of the mold flask assembly to permit such assembly to be rolled over by the operator. It is a principal object of my invention to provide certain modifications and improvements on such Oyster et al. machine whereby less skill will be required on the part of the operator using the same.

In machines of this type, after the cope and drag flasks have been filled and rammed, the cope is drawn from the pattern by clamping the former to the squeeze head and lowering the drag and pattern by lowering the supporting table. It not infrequently happens that the flask assembly may be slightly tilted relative to such supporting table and squeeze head due to sand on the table or the like or such cope flask may be somewhat tilted relative to the remainder of the pattern and flask assembly for similar reasons. In view of the taper or clearance ordinarily provided in such patterns such slight degree of tilt may usually not be objectionable if the cope is drawn smoothly and evenly without further tilting of the same. When, however, clamping means is employed on the squeeze head of a type merely adapted to hook under a flange of the cope flask, it will be obvious that as the table supporting the drag and pattern descends one such hook means will engage such flange before the cooperating hook means engages the flange at the other end of the flask. The cope flask and mold will consequently be tilted relative to the pattern during the draw with the result that the cope mold may be seriously damaged or destroyed. It is accordingly an important object of my invention to provide mold flask clamping means operative in conjunction with other elements of the molding machine to insure a straight line draw of the cope.

The cope will desirably be swung to one side after the draw to permit drawing of the pattern from the drag and the cope will then be swung back into position above the drag and replaced upon the latter to form the completed mold. It is a further object of my invention to provide positive clamping means for clamping the cope whereby the latter will be rigidly held against displacement and may accordingly be readily returned into position registering with the drag.

Still another object is to provide mold flask clamping means wherein two cooperating clamping fingers are employed which are, however, independently actuated to the extent that one may continue to move after the other has already engaged the flask. As a consequence, even when such flask is somewhat imperfectly centered relative to such clamping means, it will not be laterally displaced by action of the clamping finger first engaging the same.

Another object is to provide swinging trunnion cradles for the trunnions of the mold flask assembly mechanically interconnected for operation by a single operating means, whereby such cradles are caused to move exactly in unison one with the other.

Another object is to provide such trunnion cradle actuating means which will offer a minimum of obstruction to the jolt table of the machine.

Yet another object is to provide such trunnion cradles and corresponding trunnions on the mold flask assembly adapted to insure automatic positioning of the latter even when such mold flask assembly is not entirely properly located on the jolt table.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a top plan view of the squeeze plate and clamping means mounted thereon, partly broken away better to show the internal construction of a portion of such clamping means;

Fig. 4 is a front elevational view of the squeeze plate and clamping means of Fig. 3;

Fig. 5 is an end elevational view of the squeeze plate and clamping means shown in Figs. 3 and 4;

Fig. 6 is a front elevational view similar to Fig. 4 but illustrating the manner in which the cope flask will be gripped and held by the clamping means even when such flask is in tilted position;

Figure 13:
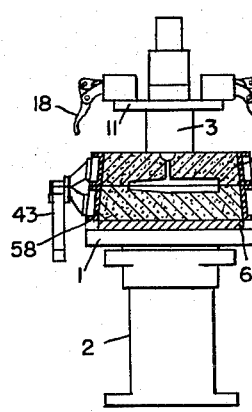
Figure 14:
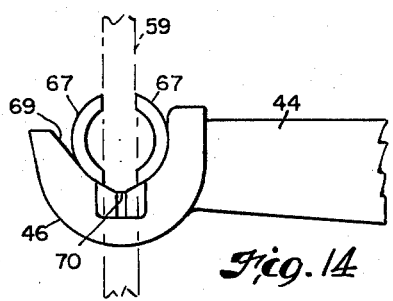

Figs. 7 to 13 inclusive are semi-diagrammatic front elevational views of the molding machine of this invention illustrating in sequence various stages in the operation of the same; and Fig. 14 is a fragmentary detail view of a trunnion cradle of the mold flask assembly lifting means.

General construction

Figure 1:
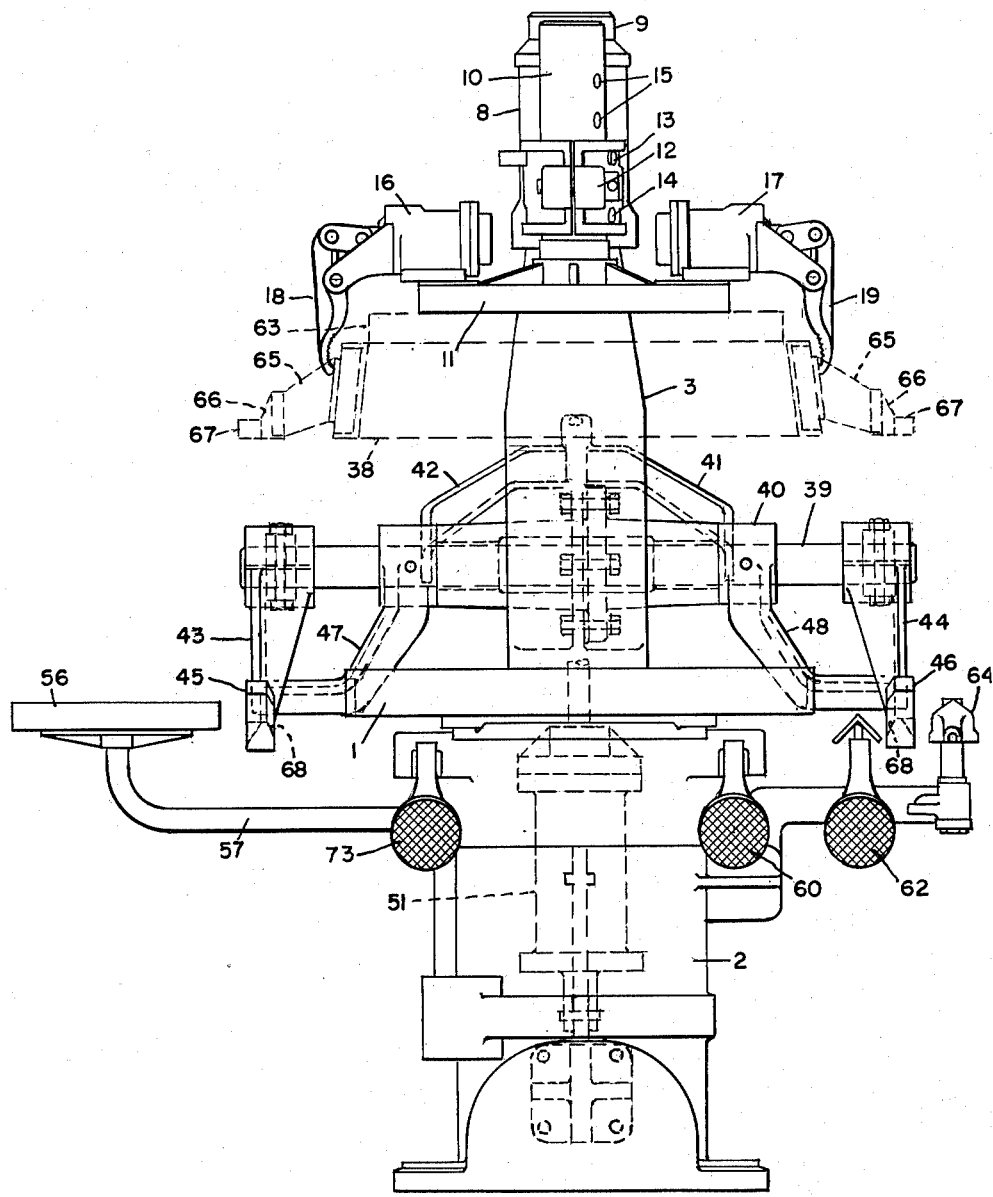
Fig. 1 is a front elevational view of one preferred embodiment of my new molding machine.
Figure 2:
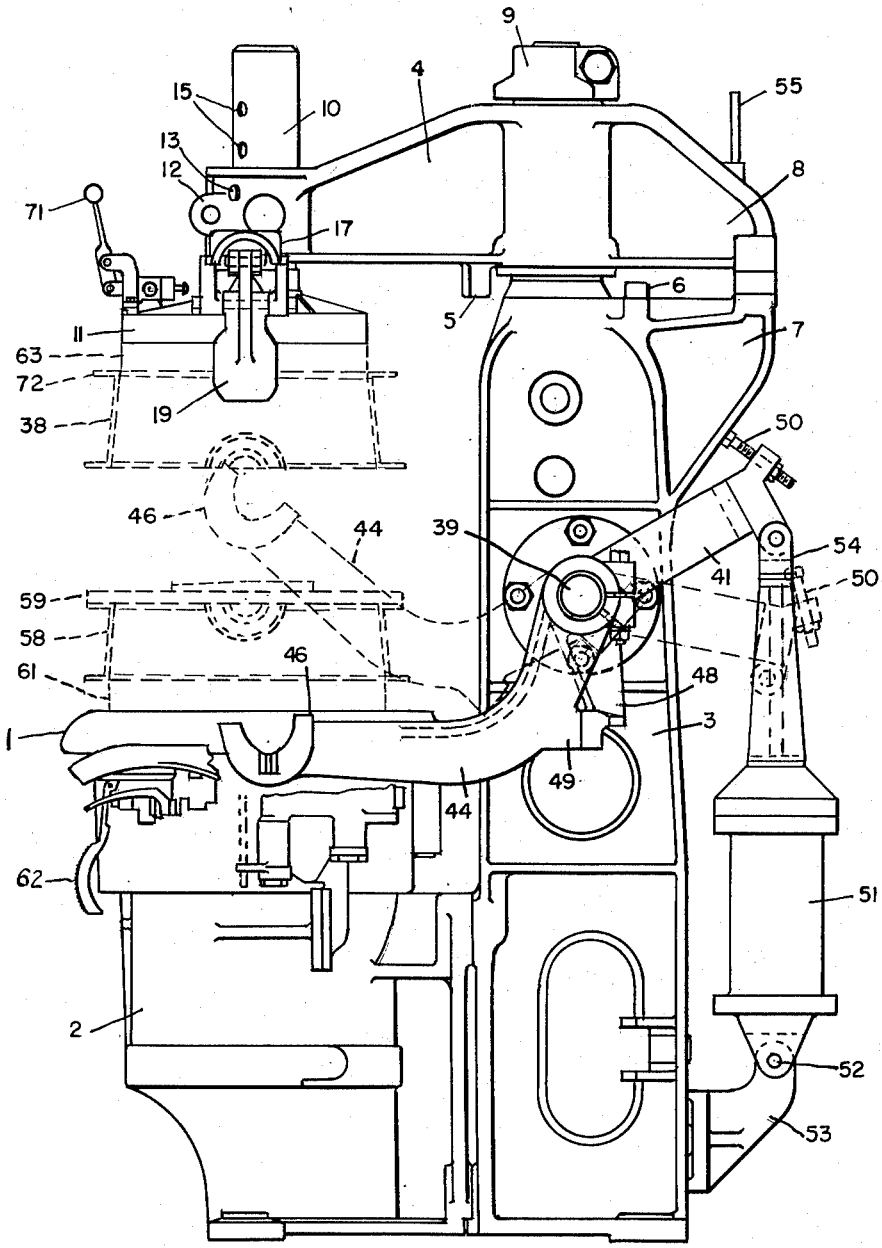
Fig. 2 is a side elevational view of such molding machine.

Referring now more particularly to said drawing and especially Figs. 1 and 2 thereof, the embodiment of my invention there illustrated comprises a jolt table 1 of conventional construction supported by a piston-cylinder assembly within base 2, whereby such table may be raised or lowered as desired or jolted to ram the molding sand within a flask supported thereon.

To the rear of such table and joined to the base thereof is a heavy standard or column 3 carrying a massive squeeze head 4 which is in turn adapted to support the squeeze plate above the table 1. The head 4 is mounted for swinging movement about a vertical axis, such movement being limited by engagement of abutment 5 with stop 6 on such column. A rearwardly extending brace 7 on the column is adapted to support a corresponding extension 8 of head 4 during the squeezing operation. A collar 9 is clamped to the top of the column above such head.

Referring now additionally to Figs. 3 to 6 inclusive, the squeeze head proper carries a vertical stud or stub shaft 10 centrally secured to the upper surface of the squeeze plate 11. Such stud is adapted to be firmly gripped in clamping collar 12 at the end of swinging head 4, and to additionally secure the same a pin may be inserted through either of openings 13 or 14 in such collar and a corresponding selected hole 15 through such stud.

Clamping means

The mold flask clamping means comprises a pair of identical fluid pressure cylinders 16 and 17 adjustably mounted on the upper side of squeeze plate 11 to either end thereof with clamping fingers 18 and 19 respectively pivotally mounted in brackets 20 and 21 extending from such cylinders. Pistons 22 and 23 are pivotally connected to the upper ends of fingers 18 and 19 respectively by means of links 24 and 25. As shown in Fig. 3, compression springs 26 within such cylinders serve to hold such pistons normally retracted and when fluid pressure is admitted behind piston heads 27 such pistons will be extended independently of one another to rock their respective clamping fingers toward dotted line position as shown in Fig. 4.

Such cylinders 16 and 17 are carried by bases or mounts 28 and 29 slotted to receive bolts 30 whereby they may be adjustably positioned toward and away from each other. Squeeze plate 11 is grooved at 31 and 32 to receive corresponding tongues 33 on the under side of the cylinder mounts to maintain such cylinders in proper alignment.

The inner clamping faces 34 and 35 of clamping fingers 18 and 19 are arcuately curved and slightly serrated to insure proper gripping of the mold flask as more fully explained below. The extreme ends 36 and 37 of the clamping fingers may desirably project inwardly toward each other to serve as safety stop means in the possible though unlikely event of inadvertent slipping of the flask 38 during the draw.

Roll-over lifting arms

A shaft 39 is journalled in horizontal bearing 40 transversely mounted in column 3 intermediate table 1 and head 4. A yoke is pivotally mounted on such shaft with the arms 41 and 42 of such yoke embracing column 3. A pair of mold lifting arms 43 and 44 are adapted to be clamped in desired adjusted position along the respective outer portions of shaft 39, such arms terminating in trunnion cradles 45 and 46 respectively. Extensions 47 and 48 of yoke arms 42 and 41 respectively bear against elbows 49 of mold flask lifting arms 43 and 44. Consequently, when the yoke comprising arms 41 and 42 is rocked, mold flask lifting arms 43 and 44 will likewise be rocked about the same axis to raise and lower trunnion cradles 45 and 46 carried thereby. An adjustable stop 50 mounted on such yoke and adapted to engage brace 7 on column 3 serves to limit downward swinging action of arms 43 and 44.

A fluid pressure piston-cylinder assembly 51 is pivotally mounted at 52 on a bracket 53 on the base of column 3 and piston 54 extending upwardly therefrom is pivotally connected to such yoke. Upon admission of fluid pressure to such piston-cylinder assembly, piston 54 may be caused to move downwardly to rock such yoke and mold flask assembly lifting arms in a clockwise direction. Upon release of such fluid pressure the weight of the lifting arms (and also, ordinarily, the weight of the mold supported thereby) is sufficient to raise the piston and permit trunnion cradles 45 and 46 to descend to a position slightly below the level of the upper surface of table 1. Such piston-cylinder assembly may be of the double-acting type, if desired, however.

As shown in Fig. 2, an upstanding pin 55 may be provided on brace portion 8 of squeeze head 4 to serve as a convenient rack for the conventional sprue cutter. A flat support 56 carried by swinging arm 57 is likewise conventional and may be employed as a rest for the empty flasks after stripping from the completed mold; or a roller conveyor may instead be provided onto which the completed mold is moved prior to stripping the flasks.

Operation

Figure 7:
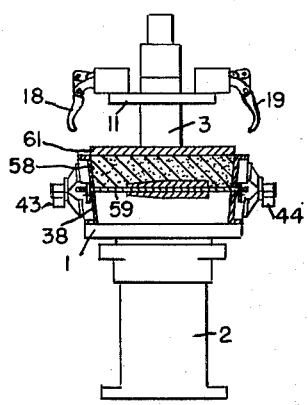

Referring now more particularly to Figs. 7 to 13 inclusive, the operation of my new molding machine will now be described together with certain details of construction most easily understood in conjunction with a description of the operation. As shown in Fig. 7, the mold flask assembly is placed upon jolt table 1 with cope flask 38 underneath and drag flask 58 on top. The squeeze head 4 will usually be swung to one side out of the way at this time. The pattern plate 59 is, of course, interposed therebetween. The operaotr fills the drag 58 with molding sand and jolt rams the same by depressing central knee valve 60 in conventional manner. The bottom board 61 is now bedded and clamped to the drag flask for the roll-over operation (Fig. 7 shows the machine at this stage in the operation).

Figure 8:
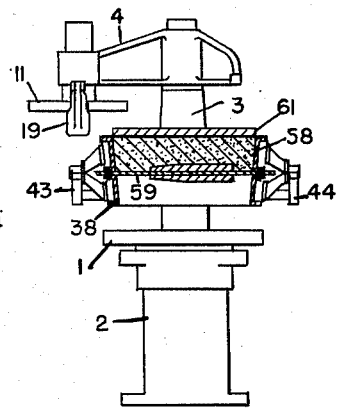
Figure 9:
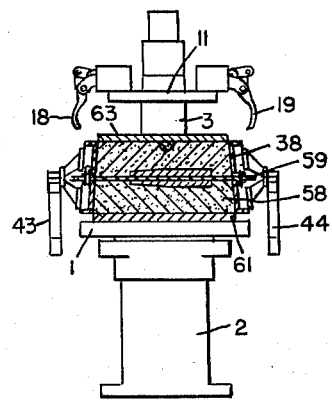
Figure 10:
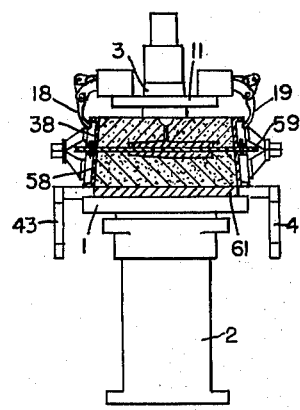

With squeeze head 4 swung to one side as shown in Fig. 8 to get squeeze plate 11 and the lifting clamps out of the way, the right-hand knee valve 62 (Fig. 1) is now depressed admitting fluid pressure to the upper end of cylinder 51 and thereby moving piston 54 downwardly therein. This causes roll-over lifting arms 43 and 44 to be rocked upwardly through the action of yoke 41, 42 pivotally connected to the upper end of such piston. Trunnion cradles 45 and 46 accordingly engage the trunnions of such mold flask assembly to lift the latter from table 1, whereupon the operator may easily roll such assembly over (Fig. 8). Fluid pressure piston-cylinder assembly 51 is now actuated to lower arms 43 and 44 to deposit the mold flask assembly on table 1 with the cope 38 uppermost and the drag 58 underneath. The cope is filled with sand and, since further jolting is ordinarily undesirable as tending to damage the drag mold already formed, the squeeze head will be swung back into position above table 1, a squeeze board 63 (Figs. 1 and 2) set upon the cope and the mold squeezed by actuation of the conventional hand-operated squeeze valve 64 (Fig. 1) which admits fluid pressure to the piston-cylinder assembly carrying table 1 causing such table to rise to bring such squeeze board into engagement with squeeze plate 11 carried by squeeze head 4. Table 1 is thereupon again lowered into position as illustrated in Fig. 9 and the squeeze head is swung out to facilitate removal of the squeeze board and cutting of the sprue. Such squeeze operation is, of course, conventional and is carried out in the usual manner. It will be understood that Fig. 1 merely shows the cope and squeeze board in dotted line to indicate their positions during this operation, the drag and bottom board not being illustrated and the squeeze table being shown in lowered position.

Referring to Figs. 1, 2 and 14, the split trunnion means provided on the mold flask assembly will now be described somewhat more in detail. Such split trunnions are generally similar to the trunnions described in Oyster et al. Patent No. 2,012,478 but have been modified to require less skill on the part of the operator in locating the mold flask assembly upon table 1 and in otherwise adjusting the machine. Brackets 65 attached to the opposite ends of the respective cope and drag flasks carry the trunnions proper which comprise conical tapering portions 66 and terminal cylindrical portions 67. As best shown in Fig. 14, such cylindrical portions will preferably be of such arcuate dimensions that, when spaced apart by pattern plate 59 interposed between the two flasks, they will have a common center, thereby together forming a circular tubular trunnion adapted to be engaged by the respective trunnion cradles 45 and 46 of lifting arms 43 and 44 respectively. The conically tapering portions 66 of such complementary split trunnion members insure that the flask assembly will automatically position itself in such cradles when engaged thereby, although the assembly may have been slightly out of proper position upon table 1. Such automatic positioning of the trunnions in the lifting cradles is further facilitated by a taper or bevel 68 (Fig. 1) on the inner faces of the cradles which cooperate with tapered portions 66 of the trunnions to this effect. As best shown in Fig. 14, the outer lip portions 69 of the trunnion cradles are also bevelled or relieved to insure automatic positioning of the trunnions even though the mold flask assembly may have been located a little forwardly of proper position on table 1. The rear lip portions may be bevelled to a lesser degree to assist in positioning the trunnions should the flask assembly be located a little rearwardly of proper position on the table. The outer sides of such cradles are also notched at 70 to spill any sand which may inadvertently have fallen thereon.

The squeeze board 63 is now manually removed and the sprue cut in the usual manner.

After swinging the squeeze head into position over the mold flask assembly, table 1 is again raised to bring the cope 38 a short distance below squeeze plate 11 (Figs. 4 and 10), and manually operated valve 71 mounted on the squeeze plate is moved to admit fluid pressure (ordinarily air pressure) to clamp operating cylinders 16 and 17. Clamping fingers 18 and 19 thereupon move inwardly to grip the upper peripheral flange 72 of cope flask 38. If the squeeze head is slightly out of register with the mold flask assembly, no harm is done since, should one clamping finger engage the cope before the other clamping finger engages the same, the cope will not be laterally displaced thereby because the other clamping finger will continue to swing inwardly until it also enters into cooperative clamping engagement. Similarly, it is not essential that the cope shall have been elevated to an exactly predetermined elevation since the inner clamping surfaces of the clamping fingers are arcuately curved and will engage and support flange 72 at whatever point they meet the latter. The serrated surface of such inner clamping faces additionally insure against slipping of the cope during the subsequent drawing operation. In the remote event of any such slipping occurring, the cope will not be dropped but will be caught by the inwardly projecting portions or hooks 36 and 37 of the respective clamping fingers. As shown in Fig. 6, should the cope be somewhat tilted when engaged by the clamping fingers, this exact degree of tilt will be preserved during the subsequent drawing operation and the higher side of the cope will not be permitted to drop during the draw until caught by a hook or like means as has been the case in prior art constructions.

Figure 11:
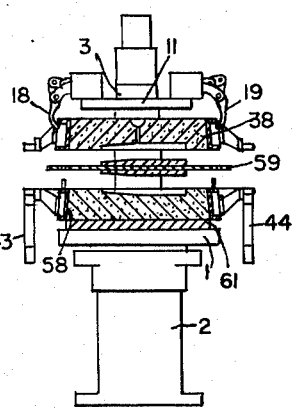
Figure 12:
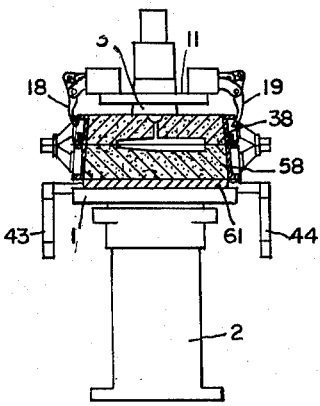

When the cope has been thus securely clamped, table 1 is lowered to draw the cope and conventional means (not shown) operated by knee valve 73 may be provided to vibrate the pattern plate during the draw if desired. In this manner the draw may be accomplished with both speed and accuracy even when large or deep flasks are employed. When the drag and pattern have been lowered the latter is manually drawn from the drag mold (Fig. 11). Cores may be set in the drag and the sprue hole blown out when the mold is in this position. Squeeze head 4 will ordinarily have been swung to one side to facilitate such operations.

During the drawing of the cope from the pattern the cope will be held properly for a straight clean draw without damage to the mold even if it is somewhat tilted or inclined due to uneven compacting of sand in the flask, for example. The curved clamping fingers hold it in whatever position it is gripped.

The cope mold is now swung into closing position (Fig. 12) and the drag mold is raised by table 1 until it engages the cope. The usual guide pins on the drag engage and register in corresponding guide bushings in the cope flask to automatically line up the two mold sections. Clamps 18 and 19 are now moved outwardly to release the cope and the table is lowered, the finished mold now being ready to be transferred to a conveyor or set out on the pouring floor (Fig. 13).

It will be seen that I have provided a novel molding machine which relieves the operator of any heavy lifting, permitting larger castings to be made by the jolt-squeeze roll-over method and at a greater rate of production. The capacity of the machine may be further increased by employing two pair of clamping fingers, permitting larger and heavier molds to be handled. As with conventional molding machines, the fluid pressure medium employed to operate the various mechanisms will ordinarily be air pressure since this is already available in foundries and is entirely suitable for the purpose. Hydraulic fluids such as oil may, however, be employed.

The pivotally mounted roll-over lift arms are particularly advantageous since the operating means therefor may be located to the rear of the machine, out of the operator's way. Furthermore, since such arms are mechanically interconnected, they will move and engage the mold flask assembly trunnions in unison, a very desirable feature. The lateral extensions of the yoke permit ready adjustment of the lifting arms toward and away from each other without affecting the rocking action.

The clamp finger operating cylinders may be connected with a source of air pressure through one and the same valve as above described, with one finger continuing to swing inwardly to clamping position even after the other finger has already engaged the cope and ceased moving.

The clamping fingers should be of substantial width, particularly when only a single pair is employed, so that the opposed arcuately concave surfaces thereof may firmly grip the mold flask flange. Reference may be had to my co-pending application Serial No. 98,588, filed June 11, 1949, for a disclosure of a somewhat related form of molding machine adapted to handle larger and heavier molds.

My new molding machine provides a mechanism which will meet general foundry requirements using standard related equipment. Not only does its use result in a considerable saving in labor but it is also very flexible in operation, employing the usual types of patterns, bottom boards, etc., and handling a variety of sizes of flasks.

Other modes of applying the principle of the invention may be employed, change being made as regards the details described, provided the features stated in any of the following claims or the equivalent of such be employed.

I therefore particularly point out and distinctly claim as my invention:

1. In a roll-over molding machine, a table upon which a mold flask assembly is adapted to be placed, a horizontal shaft mounted rearwardly of and above said table, a pair of forwardly extending lifting arms mounted on said shaft at the outer ends thereof, one to either side of said table, for pivotal movement about the axis of said shaft and adjustable laterally therealong, lever means mounted on said shaft and disposed rearwardly thereof to act as a fulcrum intermediate said lifting arms and having laterally extending portions adapted to engage said arms in all adjusted positions, horizontally aligned upwardly open trunnion cradles carried by the respective ends of said arms adapted when raised to engage and lift corresponding trunnions on such mold flask assembly to permit the latter to be rolled over, and a fluid pressure piston-cylinder assembly operative to rock said lever means thus to swing said arms in unison to raise and lower said cradles.

2. In a jolt squeeze molding machine having a vertically reciprocable jolt table and a squeeze head adapted to be swung laterally into and out of position above such table, mold flasks clamping means carried by such head comprising a pair of spaced opposed downwardly extending clamping fingers of substantial width pivotally mounted on such head for rocking movement toward and away from each other, the opposed faces of said fingers being serrated and arcuately concave about horizontal axes, inwardly projecting lugs on the lower ends of said fingers, separate air piston-cylinder assemblies mounted on said head adapted to rock said respective fingers toward and away from each other, and common valve means controlling said piston-cylinder assemblies.

3. In a jolt squeeze molding machine having a vertically reciprocable jolt table and a squeeze head adapted to be swung laterally into and out of position above such table, a squeeze plate carried by said head, a pair of air piston-cylinder assemblies mounted on the upper side of said plate for adjustment toward and away from each other, depending mold flask clamping fingers pivotally mounted on said assemblies and rockable thereby, said fingers extending below the under surface of said squeeze plate to either side thereof respectively and having serrated opposed surfaces of substantial width arcuately concave about horizontal axes, inwardly projecting lugs on the lower ends of said fingers, and common valve means controlling said piston-cylinder assemblies.

4. In a molding machine, a vertically reciprocable flask supporting table, flask clamping means horizontally swingable into and out of position above said table comprising opposed clamping members having opposed surfaces of substantial width arcuately concave about horizontal axes and adapted to grip and hold such flask by lateral pressure therebetween, a mold flask assembly adapted to rest on said table, trunnions on said assembly, roll-over lifting arms mounted for swinging movement about a fixed horizontal axis, means operative to swing said arms upwardly into engagement with said trunnions to lift said flask assembly above said table into position to be rolled over, and means operative to elevate said table to present such flask in position to be gripped by said clamping means.

LEON F. MILLER.

REFERENCES CITED

The following references are of record in the file of this patent:

UNITED STATES PATENTS

| Number | Name | Date |
|---|---|---|
| 274,646 | North | Mar. 27, 1883 |
| 1,249,994 | Nicholls | Dec. 11, 1917 |
| 1,695,921 | Harmes | Dec. 18, 1928 |
| 1,736,514 | Wallace | Nov. 19, 1929 |
| 1,741,116 | Ramsden | Dec. 24, 1929 |
| 1,844,466 | Fiegel | Feb. 9, 1932 |
| 2,012,478 | Oyster et al. | Aug. 27, 1935 |
| 2,142,491 | Byerlein | Jan. 3, 1939 |
| 2,438,218 | Johnston | Mar. 23, 1948 |

FOREIGN PATENTS

| Number | Country | Date |
|---|---|---|
| 184,715 | Germany | May 10, 1907 |